United States Patent Office 3,556,721
Patented Jan. 19, 1971

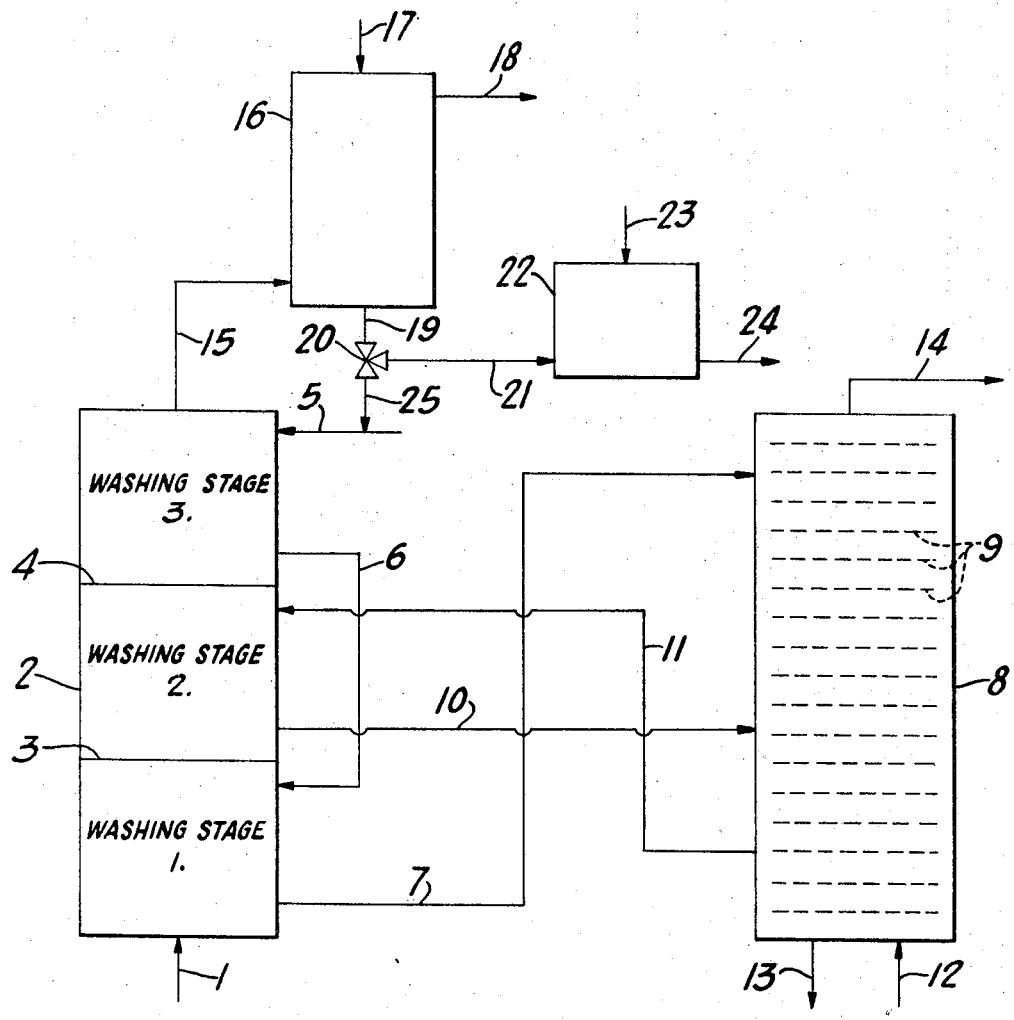

3,556,721
PROCESS FOR PURIFYING CRUDE
COKE-OVEN GASES
Paul Radusch, Essen, Germany, assignor, by mesne assignments, to Koppers Company, Inc., Pittsburgh, Pa., a corporation of Delaware
Filed Aug. 15, 1968, Ser. No. 752,982
Claims priority, application Germany, Oct. 27, 1967
1,669,326
Int. Cl. C01c 1/24
U.S. Cl. 23—119      9 Claims

ABSTRACT OF THE DISCLOSURE

A process for purifying crude coke oven gases includes the steps of flowing cooled and detarred crude gas upwardly in a three-stage gas scrubber, the top stage of which is charged with crude ammonia liquor condensate accumulating from prior cooling of the gas. The aqueous effluent of the third washing stage is delivered to the top of the bottom or first washing stage while the middle or second washing stage is treated with deacidified recycle water. The aqueous effluent accumulating in the first and second washing stages are separately introduced into a distillation column in such a way that each receives a different treatment, but the resulting liquid, after at least partial deacidification, is pumped back to the second washing stage.

BACKGROUND OF THE INVENTION

The present invention relates to a process for purifying crude coke-oven gases according to the principle of ammonia recycle scrubbing, in which the ammonia that is to be removed is used for simultaneous removal of hydrogen sulfide.

Previously, the operation most used consisted in first removing the principal amount of hydrogen sulfide from the crude gas in a so-called hydrogen sulfide scrubber with use of an ammonia-containing washing water and, after distilling off the absorbed hydrogen sulfide (deacidification), returning the ammonia-containing washing water into the hydrogen sulfide scrubber. In this process the ammonia contained in the crude gas is washed out with water in a scrubber, which is subsequently connected to the hydrogen sulfide scrubber, and the absorbed ammonia and the simultaneously washed out hydrogen sulfide and carbon dioxide are removed from this washing water in a still so that the washing water can be discarded into a drainage line or conduit. The vapors from the deacidifier (hydrogen sulfide eliminator) and the ammonia still are generally delivered into a saturator, in which the ammonia is converted to ammonium sulfate with the aid of sulfuric acid.

The gases leaving the saturator and containing very much hydrogen sulfide can be advantageously processed into sulfuric acid.

German Pat. 351,633 discloses a process in which both hydrogen sulfide scrubbers can be sprayed with condensate recovered from the ammonia still. The washing waters discharged from the hydrogen sulfide and ammonia scrubbers are withdrawn together and first introduced into a deacidifier and then into a connected ammonia still to recover the ammonia-containing condensates.

The disadvantage of this operating method is its relatively high consumption of steam for deacidification and distillation of the ammonia. This is very unfavorable to the economy of this process, especially when inexpensive steam is not available.

The present invention, therefore, pursues the goal of maintaining the consumption of steam as low as possible and thereby improving the economy of purifying crude coke-oven gases. To obtain this goal, operation should be effected by using the least amount of washing medium as possible. This requires a high selectivity in washing out hydrogen sulfide and a high intensity in washing out ammonia.

SUMMARY OF THE INVENTION

A process for purifying crude coke-oven gases according to the invention comprises flowing cooled and detarred crude gases upwardly through a three-stage gas scrubber, the top or third stage being charged with crude ammonia liquor. The aqueous effluent from the third stage is returned to the top of the first stage while the middle or second stage is charged with deacidified recycle water. Thereafter, the aqueous effluents flow into a distillation column and then back into the second washing stage.

For a further understanding of the invention and for features and advantages thereof, reference may be made to the following description in conjunction with the drawing.

BRIEF DESCRIPTION OF THE DRAWING

The drawing illustrates a schematic flow diagram of the method of the invention.

DETAILED DESCRIPTION

The set goal is obtained by the process of the present invention for purifying crude coke-oven gases according to the principle of ammonia recycle scrubbing, in which the ammonia that is to be removed is used for simultaneous removal of hydrogen sulfide and the process comprises: flowing the cooled and detarred crude gas upwardly through a three-stage gas scrubber, of which the top (3rd) washing stage is charged with the condensate (crude ammonia liquor) accumulating in the prior cooling of the gas; then delivering the aqueous effluent of this (3rd) washing stage to the top of the bottom (1st) washing stage, while operating the middle (2nd) washing stage with deacidified recycle water; and separately introducing the aqueous effluents accumulating in the 1st and 2nd washing stages into a distillation column provided with plates and, in fact, in such a way that the aqueous effluent, which is more enriched with acidic components in proportion to the ammonia content and which accumulates in the 1st washing stage, is introduced into the upper part of the distillation column while the recycle water, which is relatively less laden with acidic constituents, from the 2nd washing stage, is supplied to the lower part of the distillation column and, after at least partial deacidification, is again pumped back to the 2nd washing stage.

The gas leaving the three-stage gas scrubber still has a residual ammonia content of about 0.8 to 1.0 gram $NH_3$ per normal cubic meter of gas. This value must be further reduced to about 0.01 g. $NH_3$ per $Nm.^3$ gas. The process of the invention makes it possible to use two variants of the process to obtain this goal.

In the first variant, the gas leaving the three-stage gas scrubber is treated in a subsequently connected scrubber with acidic ammonium sulfate solution until the desired reduction of the ammonia value is obtained. The accumulated washing solution is then further processed to ammonium sulfate in a saturator with the introduction of additional ammonia.

When this variant of the process is used, the average delivery of crude ammonia liquor to the 3rd washing stage amounts to about 0.5 liters per normal cubic meter of crude gas, and that of the deacidified recycle water to the 2nd washing step amounts to about 0.91 per normal cubic meter of crude gas.

It has been recently indicated, however, that the proceeds from the sale of ammonium sulfate often do not cover its costs. Therefore, for economic reasons it can be meaningful to relinquish entirely the production of ammonium sulfate as a byproduct.

The second variant of the process considers this viewpoint. In this case the gas leaving the three-stage gas washer is treated with water in a subsequently connected scrubber until the ammonia content is reduced to the desired final value. The accumulated aqueous effluent, which cannot be disposed of because of its ammonia content, is added to the crude ammonia liquor (condensate) and the mixture is supplied to the 3rd washing stage of the gas scrubber. In this operating method, however, the amount of deacidified recycle water is reduced so that the following average charged amounts result:

| | |
|---|---|
| Mixture of crude ammonia liquor (condensate) and aqueous ammonia-containing effluent to the 3rd washing stage. | About 0.85 per Nm.$^3$ crude gas. |
| Deacidified recycle water to the 2nd washing stage. | About 0.71 per Nm.$^3$ crude gas. |

The decision as to which of the two variants of the process should be used, as already stated, is primarily dependent on economical conditions, and the deciding factors should be the prices for the obtained ammonium sulfate and for the produced and consumed sulfuric acid, as well as the prime costs of steam.

The operating method conforming to the invention will be explained in more detail with reference to the flow diagram illustrated in the drawing. For a better understanding, this flow diagram contains only the essential apparatus for carrying out the process of the invention. Accessory apparatus, such as heat exchangers, pumps, etc., are not shown. All equipment in the gas path connected prior to and after these apparatus has also been omitted.

The cooled and detarred crude gas, which is available in accordance with the teaching of Pat. 2,286,455, flows through line 1 upwardly into the three-stage gas scrubber 2, the individual stages of which are separated from one another by partitions 3 and 4, which are permeable to gas, but impervious to liquid. The condensate (crude ammonia liquor), also available in accordance with the teaching of Pat. 2,286,455, accumulating during the prior cooling of the gas, is delivered through line 5 to the top of the gas scrubber. This condensate flows down on the inserts of the top (3rd) washing stage and leaves at the bottom of this washing stage through line 6, through which it goes to the top of the bottom (1st) washing stage. Here it also again flows down on the inserts and finally goes through line 7 to the distillation column 8. This column 8, which is provided with plates 9, has the function of a combined still and deacidifier. The upper part acts as a deacidifier and the lower part as a still. The column 8 is heated directly or indirectly with steam in a known manner. Since the aqueous effluent from the first washing stage, which flows through line 7, is more enriched with acid constituents ($CO_2$, $H_2S$, and HCN) in proportion to its ammonia content, it is flowed to the upper part (deacidifier) of the distillation column 8.

On the contrary, the recycle water collected at the bottom of the second washing stage has a relatively low content of acidic constituents and, therefore, is conveyed through line 10 to the lower part (still) of column 8, in which a deacidification of the recycle water takes place. The partially deacidified recycle water is withdrawn through line 11, about eight plates beneath the inflow, and it is again delivered to the second washing stage. Steam is introduced through line 12 into column 8, while water containing about 40 mg. ammonia per liter simultaneously flows out through line 13. After an exchange of heat and cooling, this water can be discarded as waste water, or used in another manner. The vapors rising in column 8 and containing especially ammonia and hydrogen sulfide are withdrawn through line 14 and transferred for further utilization in a known manner.

After the gas passes through the three-stage scrubber 2, it leaves at the top through line 15 and goes into the subsequently connected scrubber 16, in which the ammonia content of the gas should be lowered to a residual value of about 0.01 g. per Nm.$^3$ gas. Depending on the operating method, acidic ammonium sulfate solution or water is delivered through line 17. The purified gas leaves scrubber 16 through line 18, through which it goes to a benzene scrubber (not illustrated) for further purification.

The ammonia-enriched washing solution flows from scrubber 16 through line 19. If acidic ammonium sulfate solution is used as washing solution, the three-way valve 20 is adjusted so that the discharged solution flows through line 21 into the saturator 22, in which ammonium sulfate is precipitated with addition of more ammonia. The ammonium sulfate is withdrawn from the process at 24.

On the contrary, if the scrubber 16 is operated with water, the three-way valve 20 is adjusted so that the aqueous effluent, flowing out through line 19, goes into line 25, which in turn discharges into line 5. This means that the aqueous effluent is combined with the crude ammonia liquor (condensate) and is supplied to the third washing stage of the gas scrubber 2.

The operating method conforming to the invention is now demonstrated with reference to two examples, which are based on the purification of 1000 normal cubic meters of crude gas.

Example 1 relates to the process in which the scrubber 16 is operated with acidic ammonium sulfate solution and the discharged washing solution is further processed to ammonium sulfate in saturator 22. Table 1 gives the composition of the gas in the various stages of the process, while Table 2 gives the composition of the individual washing waters used in the process.

TABLE 1

| | Grams per normal Cubic meter | | | $CO_2$, percent by volume |
|---|---|---|---|---|
| | $NH_3$ | $H_2S$ | HCN | |
| Crude gas before scrubber 2 | 8.0 | 10.0 | 1.5 | 2.5 |
| Gas after 1st washing stage | 3.5 | 7.0 | 1.1 | |
| Gas after 2nd washing stage | 3.5 | 2.0 | 0.4 | |
| Gas after 3rd washing stage | 1.0 | 1.0 | 0.3 | |
| Gas after scrubber 16 | 0.01 | 1.0 | 0.3 | |

TABLE 2

| | Grams per liter | | | | Liters per normal cubic meter |
|---|---|---|---|---|---|
| | $NH_3$ | $H_2S$ | HCN | $CO_2$ | |
| Crude $NH_3$ water in line 5 | 3.5 | 0.6 | 0.1 | 2.5 | 0.5 |
| Crude $NH_3$ water in line 6 | 8.5 | 2.6 | 0.3 | 3.5 | 0.5 |
| Crude $NH_3$ water in line 7 | 17.5 | 8.6 | 1.1 | 6.2 | 0.5 |
| Deacidified recycle water in line 11 | 20.0 | 2.5 | 0.6 | 2.6 | 0.9 |
| Enriched recycle water in line 10 | 20.0 | 8.1 | 1.4 | 6.0 | 0.9 |

Example 2 relates to the process in which scrubber 16 is operated with water and the aqueous effluent is supplied, together with crude ammonia liquor, to the third washing stage of gas scrubber 2. Table 3 shows the composition of the gas at the various points of the process, while Table 4 gives the composition of the individual washing waters used in the process.

TABLE 3

| | Grams per normal cubic meter | | | $CO_2$ percent by volume |
|---|---|---|---|---|
| | $NH_3$ | $H_2S$ | HCN | |
| Crude gas before scrubber 2 | 8.0 | 10.0 | 1.5 | 2.5 |
| Gas after 1st washing stage | 3.0 | 6.0 | 1.0 | |
| Gas after 2nd washing stage | 3.5 | 2.5 | 0.5 | |
| Gas after 3rd washing stage | 0.8 | 1.2 | 0.4 | |
| Gas after scrubber 16 | 0.01 | 1.0 | 0.3 | |

TABLE 4

| | Grams per liter | | | | Liters per normal cubic meter |
|---|---|---|---|---|---|
| | NH₃ | H₂S | HCN | CO₂ | |
| Fresh water before scrubber 16 | 0.0 | 0.0 | 0.0 | 0.0 | 0.35 |
| Discharge through line 25 | 2.3 | 0.6 | 0.3 | 1.5 | 0.35 |
| Inflow through line 5 | 3.0 | 0.6 | 0.2 | 2.1 | 0.85 |
| Inflow through line 6 | 6.2 | 2.1 | 0.3 | 3.0 | 0.85 |
| Discharge through line 7 | 12.1 | 6.8 | 0.9 | 5.0 | 0.85 |
| Deacidified recycle water in line 11 | 19.8 | 2.3 | 0.6 | 2.6 | 0.70 |
| Enriched recycle water in line 20 | 19.1 | 7.3 | 1.3 | 6.0 | 0.70 |

Although the invention has been described herein with a certain degree of particularity, it is understood that the present disclosure has been made only as an example and that the scope of the invention is defined by what is hereinafter claimed.

What is claimed is:

1. In a process for purifying crude coke-oven gases which have been cooled and detarred in a known manner that produces crude ammonia liquor condensate, the improvement comprising the steps:
 (a) flowing said cooled and detarred gases upwardly through a three-stage gas scrubber in which the third washing stage is charged with said crude ammonia liquor condensate;
 (b) delivering the aqueous effluent of the third washing stage to the top of the first or bottom washing stage;
 (c) simultaneously operating the middle or second washing stage with deacidified recycle water;
 (d) introducing aqueous effluents accumulating in the first washing stage into the upper part of a distillation column;
 (e) flowing recycle water that has a relatively low content of acidic constituents from second washing stage into the lower part of said distillation column;
 (f) heating the effluents in said distillation column and effecting deacidification of said effluents; and
 (g) flowing partially deacidified recycle water from said distillation column into said second washing stage.

2. The process of claim 1 including the steps:
 (a) treating the gases flowing from the three-stage gas scrubber with acidic ammonium sulfate solution until the ammonia content of the gas is reduced to a value of about 0.01 gr. per normal cubic meter of gas; and
 (b) treating the accumulated washing solution laden with ammonia with the addition of more ammonia to produce ammonium sulfate in a saturator.

3. The process according to claim 1 wherein:
 (a) the amount of crude ammonia liquor delivered to the third washing stage is about 0.5 liter per normal cubic meter of gas; and
 (b) the quantity of deacidified recycle water delivered to the second washing stage mounts to about 0.9 liter per normal cubic meter of gas.

4. The process according to claim 1 including the steps:
 (a) treating the gas leaving the three-stage scrubber with water until the ammonia content of the gas is reduced to a value of about 0.01 gr. per normal cubic meter of gas;
 (b) adding the accumulated ammonia laden aqueous effluent to the crude ammonia liquor; and
 (c) mixing the aqueous effluent with crude ammonia liquor condensate and flowing the mixture into the third washing stage of the gas scrubber.

5. The process of claim 1 wherein:
 (a) the quantity of mixture of crude ammonia liquor and ammonia containing aqueous effluent delivered to the third washing stage amounts to about 0.85 liter per normal cubic meter of crude gas; and
 (b) the quantity of deacidified recycled water delivered to the second washing stage amounts to about 0.7 liter per normal cubic meter of crude gas.

6. The process according to claim 4 wherein:
 (a) the quantity of mixture of crude ammonia liquor and ammonia containing aqueous effluent delivered to the third washing stage amounts to about 0.85 liter per normal meter of crude gas; and
 (b) the quantity of deacidified recycled water delivered to the second washing stage amounts to about 0.7 liter per normal cubic meter of crude gas.

7. The process according to claim 1 including:
 (a) heating the distillation column with steam.

8. The process according to claim 5 including:
 (a) heating the distillation column with steam.

9. The process according to claim 4 including:
 (a) heating the distillation column with steam.

References Cited

UNITED STATES PATENTS 2,878,099  3/1959  Breuing et al.
2,943,911  7/1960  Sweeney.
3,096,156  7/1963  Kaunert et al.

OSCAR R. VERTIZ, Primary Examiner

G. O. PETERS, Assistant Examiner

U.S. Cl. X.R.
23—3